US008972575B2

(12) United States Patent
Cyr et al.

(10) Patent No.: US 8,972,575 B2
(45) Date of Patent: *Mar. 3, 2015

(54) SERVER-SIDE WEB ANALYTICS SYSTEM AND METHOD

(71) Applicant: The Boeing Company, Chicago, IL (US)

(72) Inventors: Kenneth Cyr, Auburn, WA (US); Kesav Ram Rayaprolu, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/257,578

(22) Filed: Apr. 21, 2014

(65) Prior Publication Data
US 2014/0229617 A1 Aug. 14, 2014

Related U.S. Application Data

(63) Continuation of application No. 13/300,536, filed on Nov. 18, 2011, now Pat. No. 8,713,170.

(51) Int. Cl.
G06F 15/16 (2006.01)
G06F 15/173 (2006.01)
H04L 12/26 (2006.01)
G06F 11/34 (2006.01)
G06F 11/30 (2006.01)
H04L 29/08 (2006.01)

(52) U.S. Cl.
CPC ............ H04L 43/04 (2013.01); G06F 11/3495 (2013.01); G06F 11/3065 (2013.01); G06F 11/3006 (2013.01); H04L 67/02 (2013.01)
USPC .......................................... 709/224; 709/203

(58) Field of Classification Search
CPC .................... G06F 9/546; H04L 2463/141
USPC ......... 709/218, 219, 223, 224, 227, 231, 250; 718/100; 726/4; 370/249
See application file for complete search history.

(56) References Cited

U.S. PATENT DOCUMENTS

| 5,608,720 | A  | * | 3/1997 | Biegel et al. .................. 370/249 |
| 6,052,695 | A  | * | 4/2000 | Abe et al. ........................... 726/4 |
| 6,256,659 | B1 | * | 7/2001 | McLain et al. ................ 718/100 |
| 6,295,518 | B1 | * | 9/2001 | McLain et al. ................ 709/227 |
| 6,453,356 | B1 | * | 9/2002 | Sheard et al. ................. 709/231 |

(Continued)

OTHER PUBLICATIONS

IBM Coremetrics Web Analytics—Fueling Digital Optimization and Marketing Execution, web pages, from Nov. 17, 2011, from Internet website at web address http://www.coremetrics.com/solutions/web-analytics.php, 3 pages.

(Continued)

Primary Examiner — Quang N Nguyen

(57) ABSTRACT

There is provided a server-side web analytics computer implemented system and method. In an embodiment the system has at least one computer server for receiving an electronic request from a web enabled source. The computer server has a web application for creating a log message from the electronic request. The computer server further has an automated server-side web analytics system for processing the log message into an action message and for processing the action message into a reporting message. The server-side web analytics computer implemented system generates asynchronously and in near real-time web analytics data from the reporting message.

13 Claims, 8 Drawing Sheets

(56) References Cited

U.S. PATENT DOCUMENTS

| | | | |
|---|---|---|---|
| 7,987,272 B2* | 7/2011 | Kumar et al. | 709/224 |
| 7,996,556 B2 | 8/2011 | Raghavan et al. | |
| 8,079,081 B1* | 12/2011 | Lavrik et al. | 709/223 |
| 8,266,327 B2* | 9/2012 | Kumar et al. | 709/250 |
| 8,543,665 B2* | 9/2013 | Ansari et al. | 709/219 |
| 2010/0217837 A1* | 8/2010 | Ansari et al. | 709/218 |

OTHER PUBLICATIONS

Google Analytics, web pages, from Nov. 17, 2011, from Internet website at web address http://www.google.com/analytics/, 6 pages.

Microsoft ProClarity Analytics Server 6.3 Service Pack 3, web pages, from Nov. 17, 2011, from Internet website at web address http://www.microsoft.com/downloads/details.aspx?FamilyID=E6B784A8-E7C2-4E27-9D98-41E2F2FD7467&displaylang=k&displaylang=en, 4 pages.

* cited by examiner

SERVER-SIDE WEB ANALYTICS SYSTEM AND METHOD

CROSS-REFERENCE TO RELATED APPLICATIONS

The present application is a continuation of and claims priority to pending application Ser. No. 13/300,536, filed Nov. 18, 2011, and entitled SERVER-SIDE WEB ANALYTICS SYSTEM AND METHOD, the entire contents of which is incorporated herein by reference.

BACKGROUND

1) Field of the Disclosure

The disclosure relates generally to web analytics systems and methods, and more particularly, server-side web analytics systems and methods.

2) Description of Related Art

Web analytics systems and methods collect, analyze, and report web-based data or metrics in order to understand, research, and optimize web usage of users. Known systems and methods of collecting, analyzing, and reporting web analytics exist. One known system and method may use web log analysis with web logs to collect, analyze, and report web analytics data. However, such web logs for web applications may not report detailed information asynchronously and such information may not be processed in near real-time. Another known system and method may only use client-side scripting, such as JAVASCRIPT, to report web analytics data to external third parties, such as third party clients or third party vendors. However, such client-side scripting may use unsecure methods to collect, analyze, and report web analytics and metrics on a web browser. Further, such client-side scripting may not be possible to use on certain web enabled mobile devices or web enabled hand-held computing devices. Moreover, such client-side scripting web analytics systems and methods may be difficult and costly to implement and may incur increased ongoing support costs.

Accordingly, there is a need in the art for an improved system and method for server-side web analytics that provide advantages over known systems and methods.

SUMMARY

This need for an improved system and method for server-side web analytics is satisfied. As discussed in the below detailed description, embodiments of the improved system and method for server-side web analytics may provide significant advantages over known systems and methods.

In an embodiment of the disclosure, there is provided a server-side web analytics computer implemented system. The system comprises at least one computer server for receiving an electronic request from a web enabled source. The computer server comprises a web application for creating a log message from the electronic request. The computer server further comprises an automated server-side web analytics system for processing the log message into an action message and for processing the action message into a reporting message. The server-side web analytics computer implemented system generates asynchronously and in near real-time web analytics data from the reporting message.

In another embodiment of the disclosure, there is provided a computer implemented system for capturing and processing server-side web analytics data asynchronously and in near real-time. The system comprises at least one computer server for receiving an electronic request from a web enabled source. The computer server comprises a web application for creating a log message from the electronic request. The computer server further comprises a log file system for internally logging information from the electronic request. The computer server further comprises an automated server-side web analytics system comprising a metrics processing application for processing the log message into an action message and for processing the action message into a reporting message. The metrics processing application comprises one or more collecting threads, one or more processing threads, and one or more reporting threads. The computer server further comprises asynchronously and in near real-time server-side web analytics data generated from the one or more reporting messages. The computer server further comprises an output log file system internally logging the web analytics data generated from the one or more reporting messages.

In another embodiment of the disclosure, there is provided a server-side web analytics computer implemented method. The method comprises receiving on at least one computer server an electronic request from a web enabled source. The method further comprises creating a log message from the electronic request with a web application on the computer server. The method further comprises processing the log message into an action message and processing the action message into a reporting message with an automated server-side web analytics system on the computer server. The method further comprises obtaining asynchronously and in near real-time web analytics data from the reporting message.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1A:
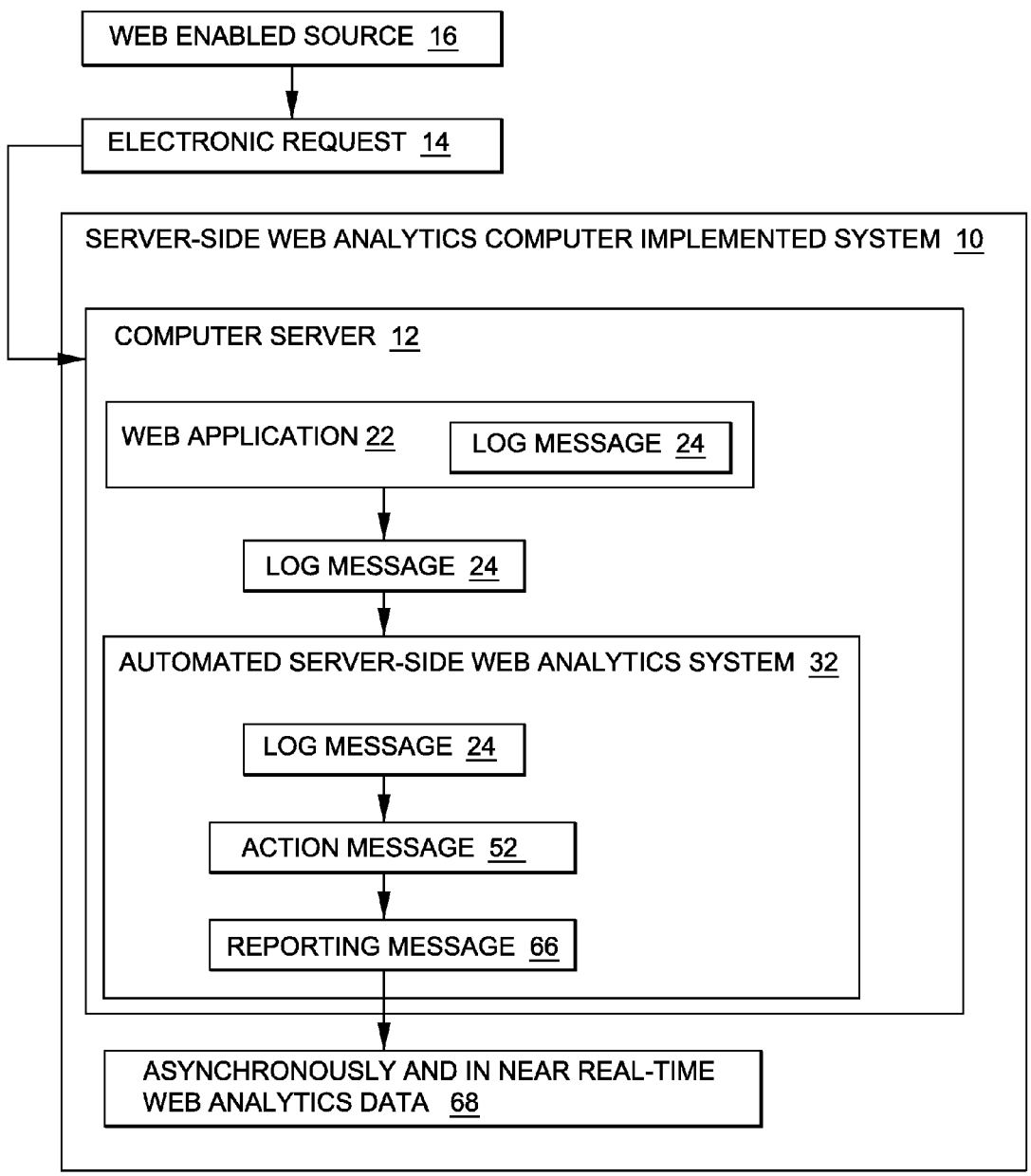
FIG. 1A is an illustration of a block diagram of one of the embodiments of a server-side web analytics computer implemented system of the disclosure.
Figure 1B:
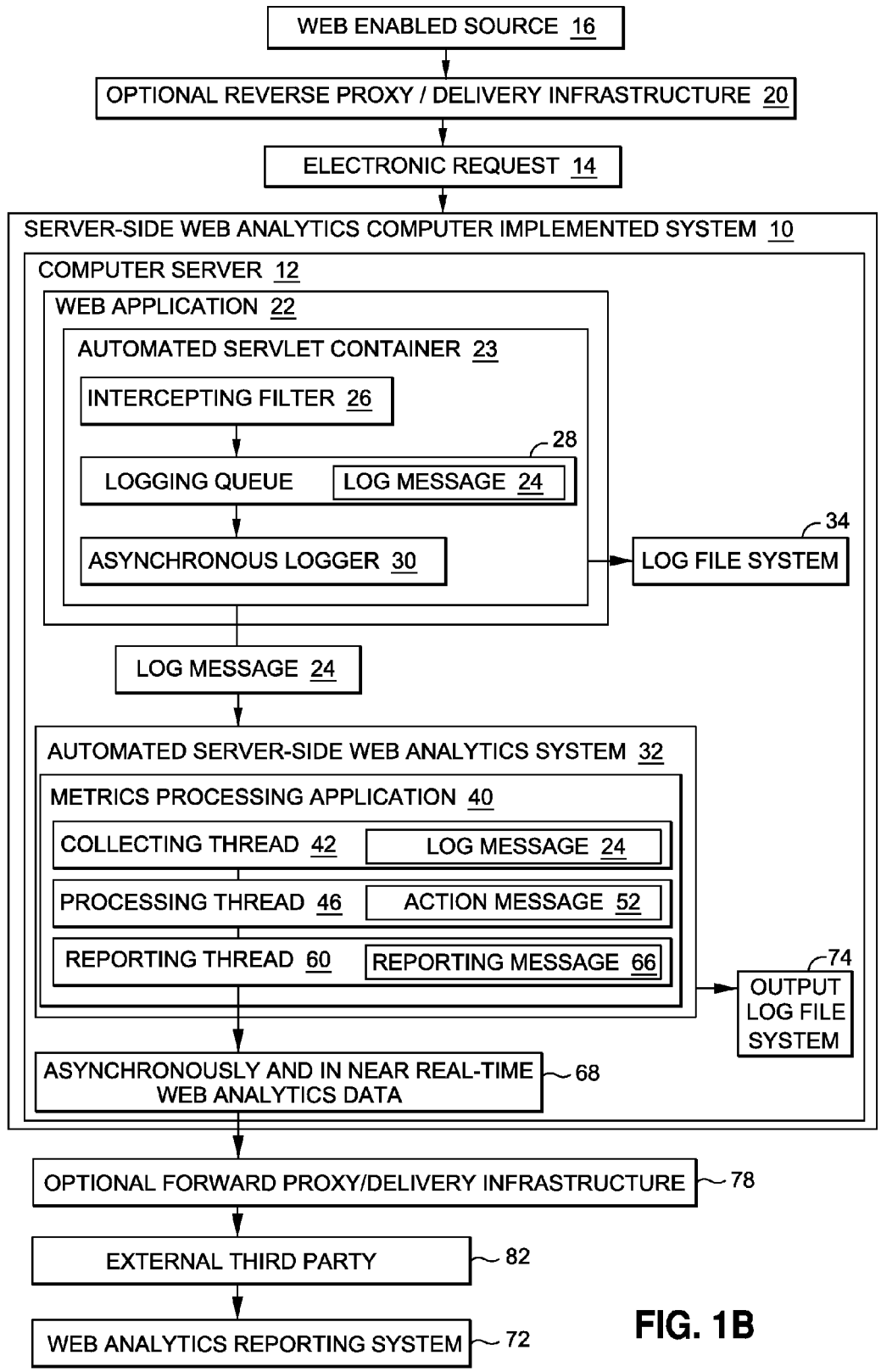
FIG. 1B is an illustration of a block diagram of another one of the embodiments of a server-side web analytics computer implemented system of the disclosure.
Figure 2:
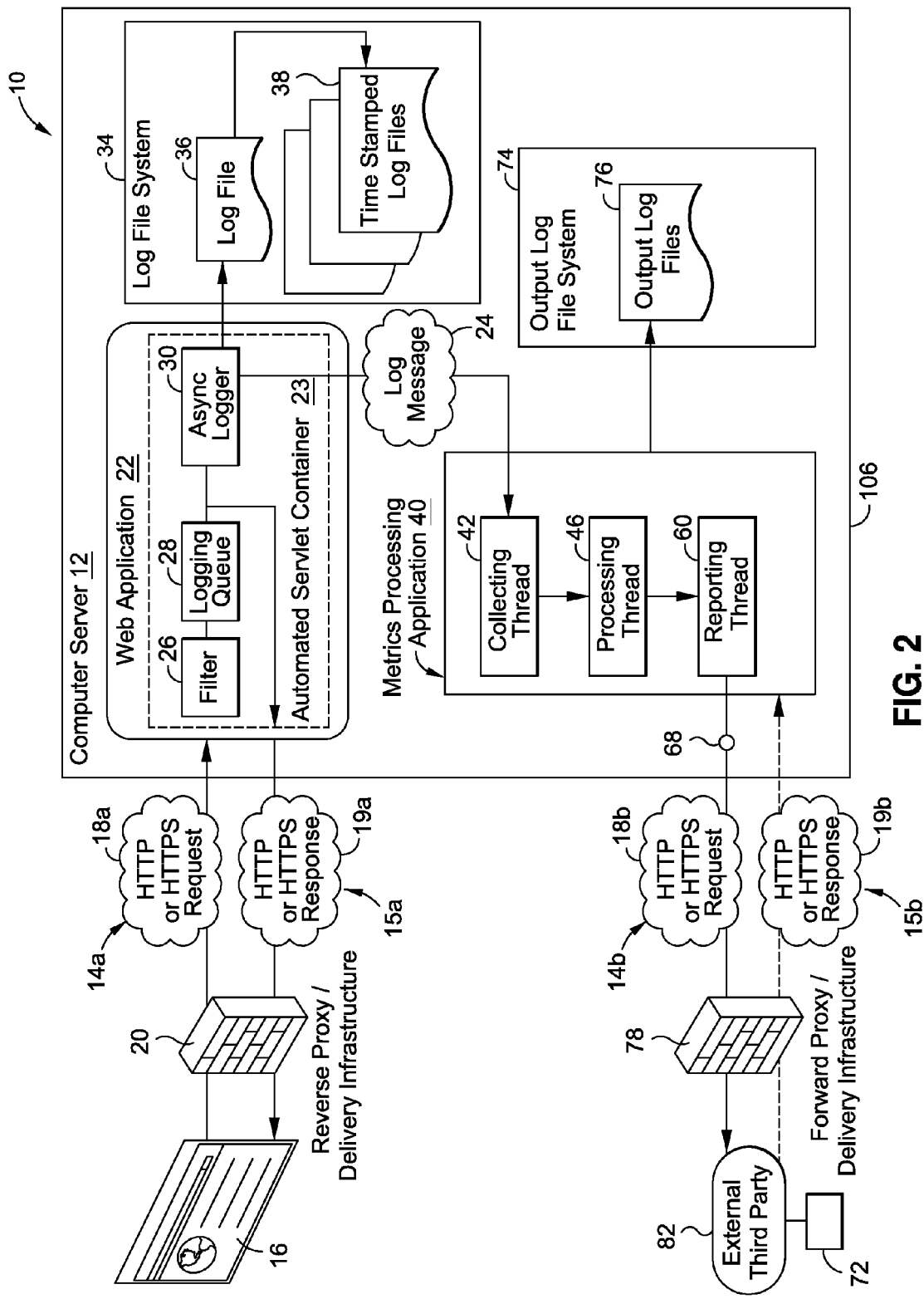
FIG. 2 is an illustration of a schematic diagram of one of the embodiments of a server-side web analytics computer implemented system of the disclosure.

In one of the embodiments of the disclosure, there is provided a server-side web analytics computer implemented system 10. FIG. 1A is an illustration of a block diagram of one of the embodiments of the server-side web analytics computer implemented system 10 of the disclosure. FIG. 1B is an illustration of a block diagram of another one of the embodiments of a server-side web analytics computer implemented system 10 of the disclosure. FIG. 2 is an illustration of a schematic diagram of one of the embodiments of the server-side web analytics computer implemented system 10 of the disclosure. As shown in FIGS. 1A-1B, the server-side web analytics computer implemented system 10 comprises at least one computer server 12 for receiving an electronic request 14 from a web enabled source 16. The web enabled source 16 may preferably comprise a web browser, a web crawler, a web enabled mobile device, a web enabled hand-held computing device, or another suitable web enabled source. Preferably, the web enabled source 16 is interactive. The electronic request 14 may comprise an electronic request 14a (see FIG. 2), such as in the form of an HTTP or HTTPS request 18a (see FIG. 2), or another suitable request. The electronic request 14 may be transmitted through a reverse proxy/delivery infrastructure 20 (see FIGS. 1B and 2). The reverse proxy/delivery infrastructure 20 may analyze the electronic request 14 or 14a before it is forwarded to the computer server 12, may protect the computer server 12 from web based attacks irrespective of their origin, may filter requests on application data fields, may provide data encryption, may enforce and verify user authentication, may prevent unauthorized access, or may provide other suitable application services.

As shown in FIGS. 1A-2, the server-side web analytics computer implemented system 10 further comprises a web application 22 on the computer server 12 for creating a log message 24 from the electronic request 14. The web application 22 may comprise an automated servlet container 23, an automated software, or another suitable web application. The web application 22 preferably comprises an intercepting filter 26 for filtering the electronic request 14. The web application 22 preferably further comprises a logging queue 28 for placing the log message 24 created from the electronic request 14 on the logging queue 28. The intercepting filter 26 captures information from the electronic request 14 and places it in the form of the log message 24 on the logging queue 28 and continues processing the electronic request 14. As shown in FIG. 2, an electronic response 15a, such as in the form of an HTTP or HTTPS response 19a, may transmit in response to the incoming electronic request 14a, back through the reverse proxy/delivery infrastructure 20 and back to the web enabled source 16.

The web application 22 preferably further comprises an asynchronous (async) logger 30 for removing the log message 24 from the logging queue 28 and sending the log message 24 to an automated server-side web analytics system 32 and to a log file system 34. The computer server 12 may further comprise the log file system 34 for internally logging log files 36 relating to information from the incoming electronic request 14 or 14a received from the web application 22. As shown in FIG. 2, the log file system 34 internally logs the log files 36 and records and stores time stamped log files 38.

Figure 3:
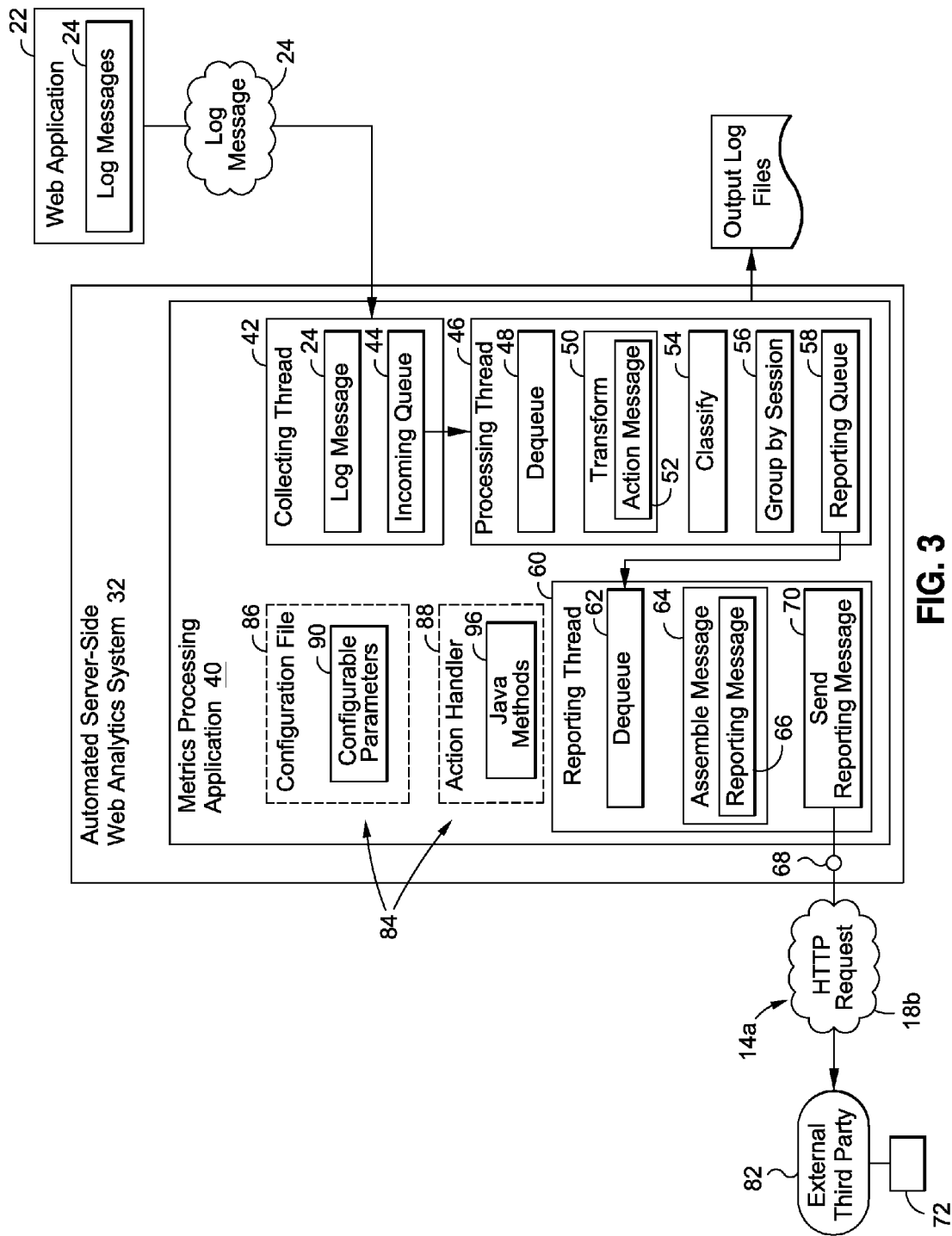
FIG. 3 is an illustration of a schematic diagram of one of the embodiments of an automated server-side web analytics system of the server-side web analytics computer implemented system of FIG. 2.

As shown in FIGS. 1A-3, the server-side web analytics computer implemented system 10 and the computer server 12 further comprises the automated server-side web analytics system 32. FIG. 3 is an illustration of a schematic diagram of one of the embodiments of the automated server-side web analytics system 32 of the server-side web analytics computer implemented system 10 of FIG. 2. The automated server-side web analytics system 32 receives the log message 24 from the web application 22. As shown in FIGS. 1B-3, the automated server-side web analytics system 32 comprises a metrics processing application 40. The metrics processing application 40 comprises one or more collecting threads 42. The collecting thread 42 receives the log message 24 from the web application 22 and places the log message 24 on an incoming queue 44.

As shown in FIG. 3, the metrics processing application 40 further comprises one or more processing threads 46. The processing thread 46 removes or dequeues 48 the log message 24 from the incoming queue 44. The processing thread 46 transforms 50 the log message 24 into an action message 52. The processing thread 46 classifies 54 the action message 52. The processing thread 46 groups by session 56 the action message 48. The processing thread 46 then places the action message 52 onto a reporting queue 58.

As shown in FIG. 3, the metrics processing application 40 further comprises one or more reporting threads 60. The reporting thread 60 removes or dequeues 62 the action message 52 from the reporting queue 58. The reporting thread 60 processes and assembles 64 the action message 52 into a reporting message 66. Thus, the metrics processing application 40 of the automated server-side web analytics system 32 processes the log message 24 into the action message 52 and further processes the action message 52 into the reporting message 66. The server-side web analytics computer implemented system 10 generates asynchronously and in near real-time web analytics data 68 from the reporting message 66.

The reporting thread 60 sends 70 (see FIG. 3) the reporting message 66, and in turn, the generated asynchronously and in near real-time web analytics data 68 from the reporting message 66, to a web analytics reporting system 72 (see FIGS. 1A-3) and to an output log file system 74 (see FIGS. 1A-3). The server-side web analytics computer implemented system 10 may further comprise the output log file system 74 for internally logging output log files 76. The output log files 76 may also comprise information from the web analytics data 68 which may be stored for record keeping purposes or another suitable purpose.

As shown in FIG. 2, the generated asynchronously and in near real-time web analytics data 68 may be in the form of outgoing electronic request 14b, such as HTTP or HTTPS request 18b, or another suitable request, and may transmit through a forward proxy/delivery infrastructure 78 and may then transmit to a web analytics reporting system 72 of an external third party 82. The external third party 82 may send electronic response 15b, such as in the form of an HTTP or HTTPS response 19b, or another suitable response, back through the forward proxy/delivery infrastructure 78, and it may then be received back by the metrics processing application 40 of the computer server 12. An example of an external third party client-side script that may be used with the system 10 disclosed herein is COREMETRICS obtained from IBM CoreMetrics of Foster City, Calif. which is entirely client-side JAVASCRIPT that runs in a web browser. (COREMETRICS is a registered trademark of International Business Machines (IBM) Corporation of Armonk, N.Y. JAVASCRIPT is a registered trademark of Oracle America, Inc. of Redwood Shores, Calif.)

Figure 4:
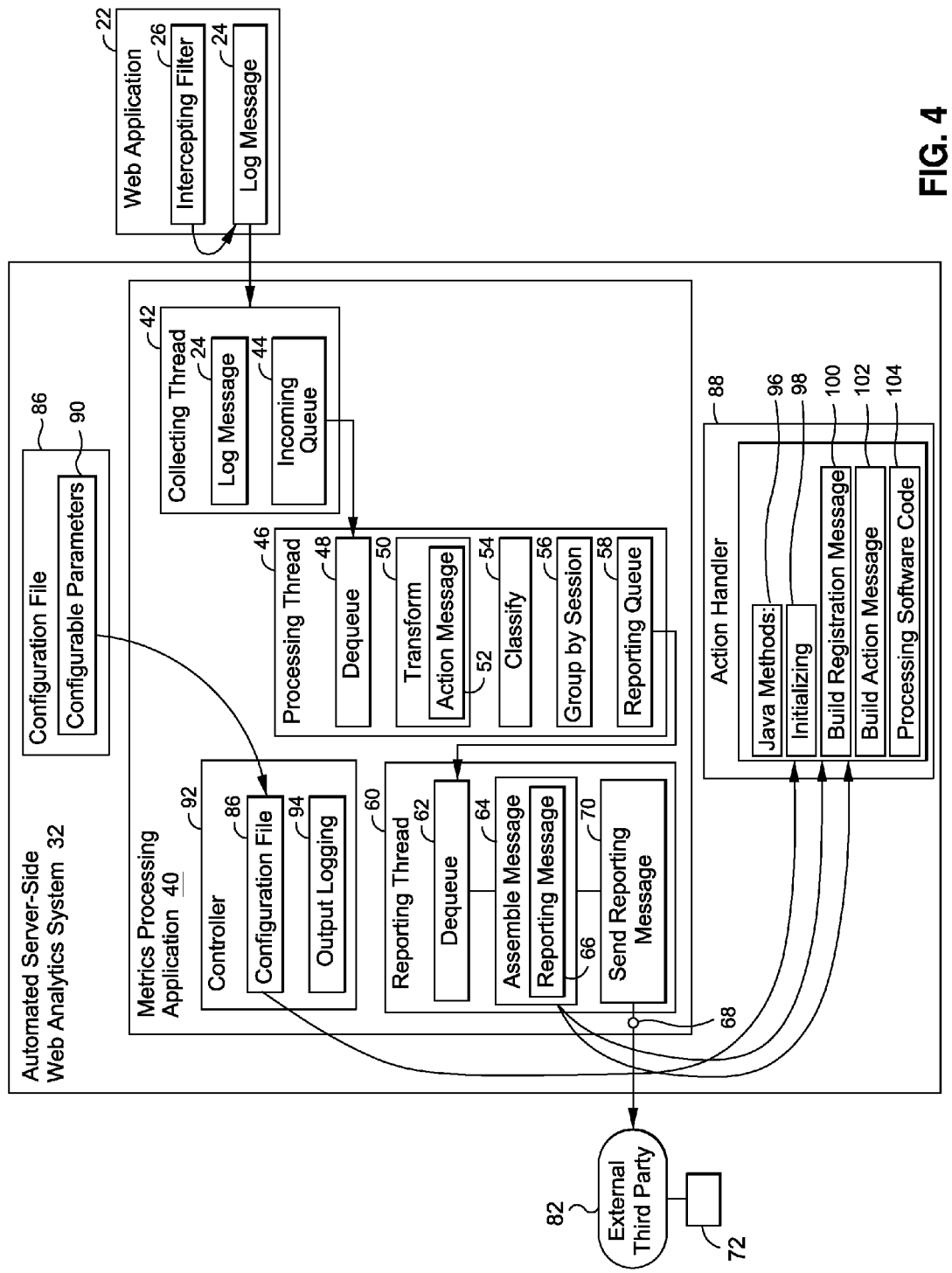
FIG. 4 is an illustration of a schematic diagram of another one of the embodiments of the automated server-side web analytics system of the server-side web analytics computer implemented system of FIG. 2 showing implementation elements.

FIG. 4 is an illustration of a schematic diagram of another one of the embodiments of the automated server-side web analytics system 32 of the server-side web analytics computer implemented system 10 of FIG. 3 showing implementation elements 84 in the form of a configuration file 86 and an action handler 88. As shown in FIG. 4, the automated server-side web analytics system 32 and the metrics processing application 40 may further comprise the configuration file 86 having a plurality of configuration parameters 90. The configuration parameters 90 may comprise defined, unique user actions that the automated server-side web analytics system 32 will report, for example, the URL (Uniform Resource Locator) of the external third party 82. As shown in FIG. 4, the configuration file 86 is controlled by a controller 92, such as a computer processing software, or another suitable controller. The controller 92 further controls output file logging 94 that logs information for the output log file system 74. As shown in FIG. 4, the configuration file 86 is preferably implemented by the action handler 88. In addition, the process and assembly 64 of the action message 52 into the reporting message 66 is preferably implemented by the action handler 88. The action handler 88 may comprise JAVA methods 96 which may contain JAVA code to process the configuration file 86. (JAVA is a registered trademark of Oracle America, Inc. of Redwood Shores, Calif.) The JAVA methods 96 may comprise initializing 98, that is, reading the configuration file 86 and extracting the desired information. The JAVA methods 96 may further comprise building a registration message 100, which is specific to the desired application, so that the external third party 82 received the registration message 100 having unique parameters. The JAVA methods 96 may further comprise building an action message 102 to also send to the external third party 82 to inform the external third party 82 how the building the action message 102 should be built. The action handler 88 comprises the minimal required set of code, for example, JAVA code, that must be implemented to process the information. The action handler 88 preferably has a processing software code 104 for implementing the metrics processing application 40. The processing software code 104 is preferably of a type from a group of code types comprising server-side JAVA application processing software, APACHE log 4j processing software, or another suitable processing software code. (APACHE is a registered trademark of Apache Micro Peripherals, Inc. of Fountain Valley, Calif.)

Preferably, the generated asynchronously and in near real-time web analytics data 68 is captured entirely on a server-side 106 (see FIG. 2) with no or minimal invasive code changes and with no or minimal instrumentation of the computer server 12. Preferably, near real-time for purposes of this application means within one hundred (100) milliseconds of the electronic request 14 occurring. Preferably, the server-side web analytics computer implemented system 10 captures one hundred percent (100%) of user defined user actions in the electronic request 14.

Figure 5A:
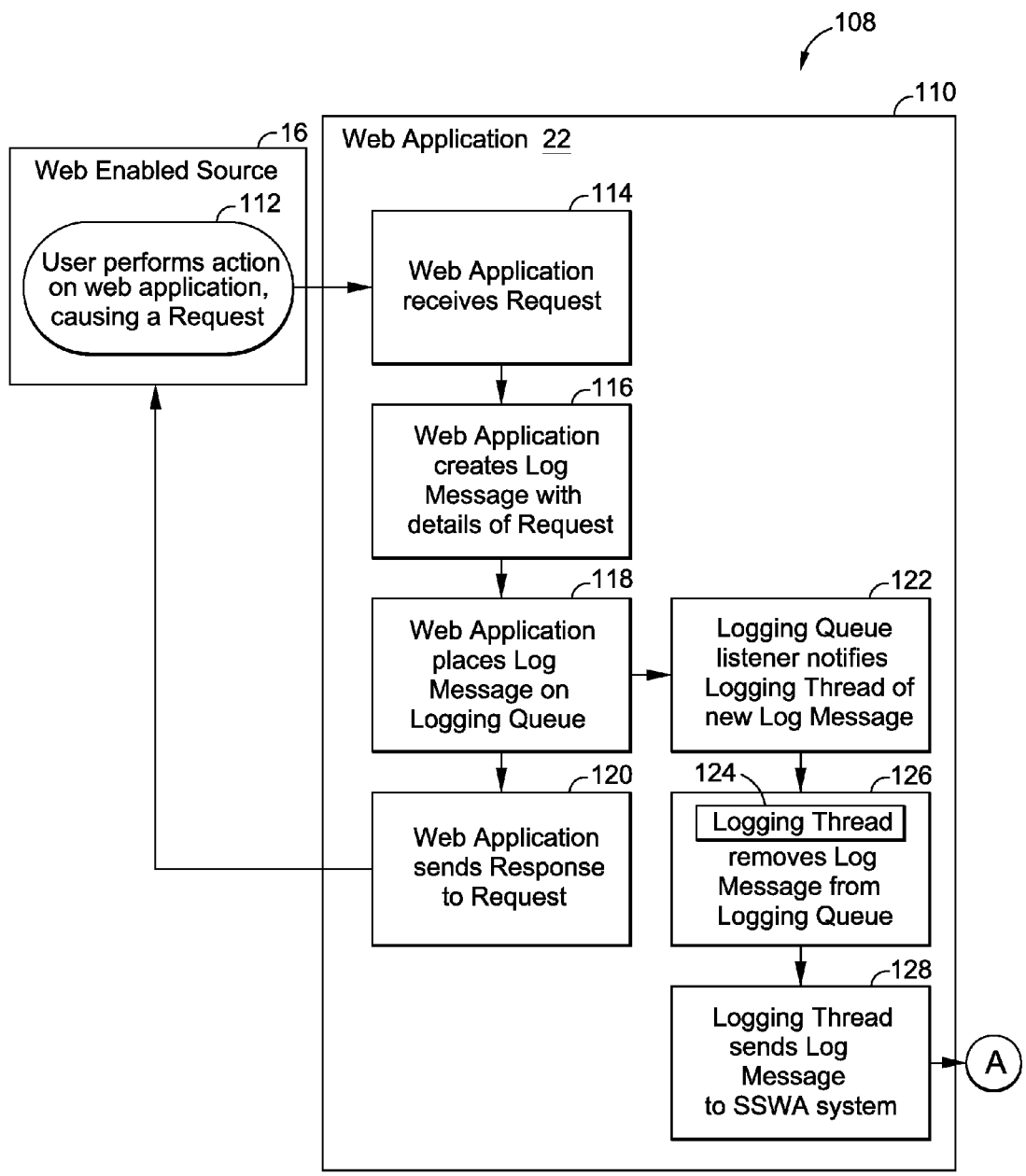
FIGS. 5A-5B are illustrations of a logic flow diagram of one of the embodiments of a server-side web analytics computer implemented method of the disclosure; and, FIG. 6 is an illustration of a flow diagram of an exemplary embodiment of a method of the disclosure.
Figure 5B:
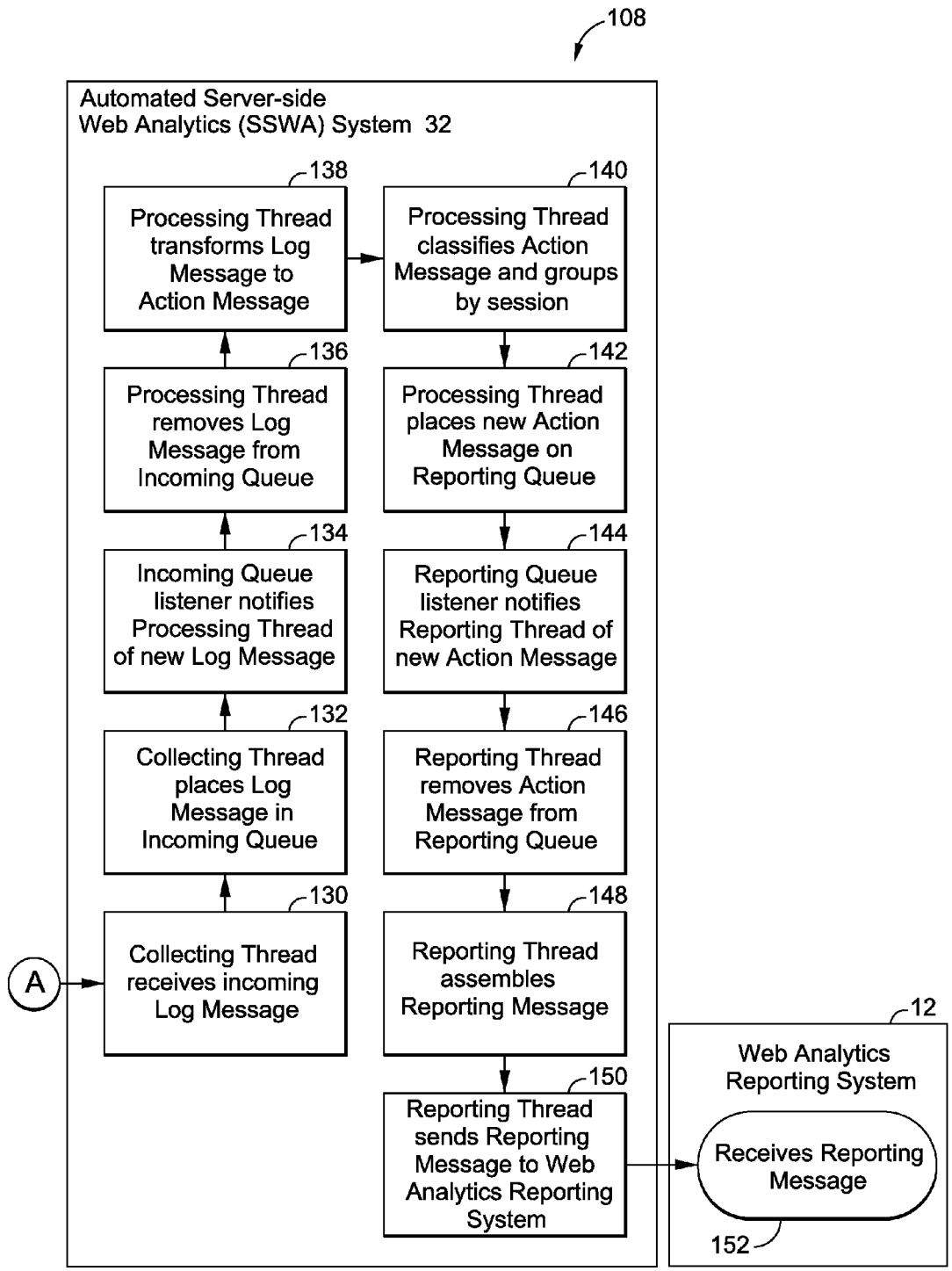

FIGS. 5A-5B are illustrations of a logic flow diagram 108 of one of the embodiments of a server-side web analytics computer implemented method 110 of the disclosure. As shown in FIG. 5A, at step 112 a user performs action, via the web enabled source 16, on a web application causing an incoming electronic request 14 (see FIG. 1A). The electronic request 14 is then received by the computer server 12 of the server-side web analytics computer implemented system 10. At step 114 the computer server 12 receives the electronic request 14. At step 116 the computer server 12 creates a log message 24 (see FIGS. 1A-2) with details from the electronic request 14. At step 118 the computer server 12 places the log message 24 on the logging queue 28 (see FIGS. 1A-2). At step 120 the computer server 12 sends an electronic response 15 in the form of an HTTP response 19a in response to the electronic request 14. At step 122 the logging queue 28 has a listener that notifies the logging thread 124, such as the asynchronous logger 30 (see FIGS. 1A-2), of the new log message 24. At step 126 the logging thread 124, such as the asynchronous logger 30 (see FIGS. 1A-2), removes or dequeues the log message 24 from the logging queue 28. At step 128 the logging thread 124, such as the asynchronous logger 30 (see FIGS. 1A-2), sends the log message 24 to the automated server-side web analytics (SSWA) system 32.

As shown in FIG. 5B, the log message 24 is received by the automated server-side web analytics (SSWA) system 32, preferably comprising the metrics processing application 40. At step 130 the collecting thread 42 receives the incoming log message 24. At step 132 the collecting thread 42 places the log message 24 in an incoming queue 44. At step 134 the incoming queue 44 has a listener that notifies the processing thread 46 of the new log message 24. At step 136 the processing thread 46 removes the log message 24 from the incoming queue 44. At step 138 the processing thread 46 transforms the log message 24 into the action message 52 (see FIG. 1). At step 140 the processing thread 46 classifies the action message 52. At step 142 the processing thread 46 places the new action message 52 on the reporting queue 58 (see FIG. 4). At step 144 the reporting queue 58 has a listener that notifies the reporting thread 60 (see FIG. 1) of the new action message 52. At step 146 the reporting thread 60 removes the action message 52 from the reporting queue 58. At step 148 the reporting thread 60 assembles the reporting message 66 (see FIG. 1B). At step 150 the reporting thread 60 sends the reporting message 66, and in turn, the generated asynchronously and in near real-time web analytics data 68 (see FIG. 1) from the reporting message 66, to the web analytics reporting system 72 (see FIG. 1). Alternatively, or in addition to, information from the generated asynchronously and in near real-time web analytics data 68 may be sent to the output log file system 74 (see FIGS. 1B-3). At step 152 the reporting message 66, and in turn, the generated asynchronously and in near real-time web analytics data 68 (see FIG. 1B) from the reporting message 66, is received by the web analytics reporting system 72 (see FIG. 1B) preferably of the external third party 82.

Figure 6:
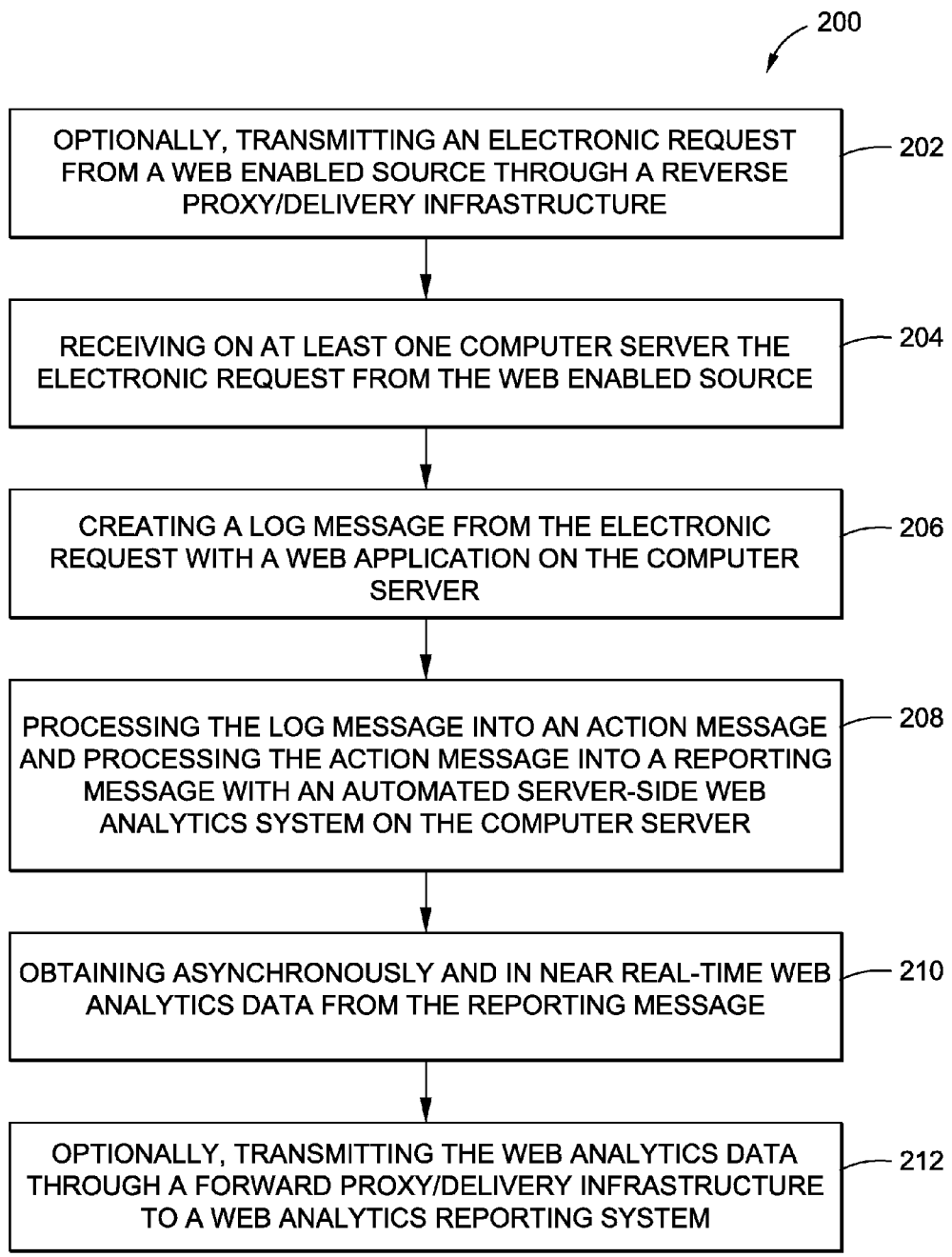

In another embodiment of the disclosure, there is provided a server-side web analytics computer implemented method 200. FIG. 6 is an illustration of a flow diagram of an exemplary embodiment of the method 200 of the disclosure. As shown in FIG. 6 the method 200 may optionally comprise step 202 of transmitting an electronic request 14 (see FIGS. 1A-2) from a web enabled source 16 through a reverse proxy/delivery infrastructure 20. The web enabled source 16 preferably comprises a web browser, a web crawler, a web enabled mobile device, a web enabled hand-held computing device, or another suitable web enabled source.

The method 200 further comprises step 204 of receiving on at least one computer server 12 the electronic request 14 from the web enabled source 16. The method 200 further comprises step 206 of creating a log message 24 (see FIGS. 1A-2) from the electronic request 14 with a web application 22 on the computer server 12. The method 200 further comprises step 208 of processing the log message 24 into an action message 52 and processing the action message 52 into a reporting message 66 with an automated server-side web analytics system 32 on the computer server 12. The method 200 further comprises step 210 of obtaining asynchronously and in near real-time web analytics data 68 from the reporting message 66. The method 200 may optionally further comprise after obtaining the web analytics data 68, step 212 of transmitting the web analytics data 68 through a forward proxy/delivery infrastructure 78 to a web analytics reporting system 72 (see FIG. 1B).

The step 206 of creating the log message 24 from the electronic request 14 may further comprise filtering the electronic request 24 with an intercepting filter 26 (see FIG. 1). The step 206 of creating the log message 24 from the electronic request 14 may further comprise creating the log message 24 with details from the electronic request 14. The step 206 of creating the log message 24 from the electronic request 14 may further comprise placing the log message 24 onto a logging queue 28 (see FIG. 1B). The step 206 of creating the log message 24 from the electronic request 14 may further comprise using an asynchronous logger 30 to remove the log message 14 from the logging queue 28 and to send the log message 24 to the automated server-side web analytics system 32 and to a log file system 34.

The automated server-side web analytics system 32 preferably comprises a metrics processing application 40 having a collecting thread 42, a processing thread 46 and a reporting thread 60. The method 200 may further comprise using the collecting thread 42 to receive the log message 24 and to place the log message 24 on an incoming queue 44. The method 200 may further comprise using the processing thread 46 to remove the log message 24 from the incoming queue 44, to transform 50 the log message 24 into an action message 52, to classify 54 the action message 52, to group by session 56 the action message 52, and to place the action message 52 onto a reporting queue 58. The method 200 may further comprise using the reporting thread 60 to remove the action message 52 from the reporting queue 58, to process and assemble 64 the action message 52 into a reporting message 66, and to send 70 the reporting message 66 to a web analytics reporting system 72 and to an output log file system 74.

The method 200 may further comprise implementing the metrics processing application 40 with a configuration file 86 comprising a plurality of configuration parameters 90 and an action handler 88 having a processing software code 104. The plurality of configuration parameters 90 and an action handler 88 having a processing software code 104 are discussed in detail above.

With the method 200, the web analytics data 68 is captured entirely on a server-side 106 with no or minimal invasive code changes and with no or minimal instrumentation of the computer server 12. The near real-time preferably comprises within one hundred (100) milliseconds of the electronic request 14 occurring. The method 200 preferably captures one hundred percent (100%) of user defined user actions in the electronic request 14.

Disclosed embodiments of the system 10 and methods 110, 200 provide a low cost, easy to implement and secure system and method to capture web analytics data relative to user actions performed on an interactive computer server 12. The system 10 and methods 110, 200 are external third party or client agnostic, entirely server-side 106, highly scalable and run asynchronously from the computer server 12. The system 10 and methods 110, 200 produce rich user interaction metrics or web analytics data from an entirely server-side solution, allowing implementation elements 84 that require minimal changes to existing web applications. Thus, the system 10 and methods 110, 200 provide for easy and lower cost implementation. Reporting is asynchronous and may not impact response time of the web application computer server. Reporting is near real-time, preferably within one hundred (100) milliseconds of an electronic request 14 or a user action occurring. The system 10 and methods 110, 200 are highly scalable and designed for low latency, low resource consumption and high throughput. The system 10 and methods 110, 200 work with any web enabled source, such as a web browser, a web crawler, a web enabled mobile device, a web enabled hand-held computing device, or another suitable web enabled source, making it suitable for secure environments and allow client-side methods and systems. The system 10 and methods 110, 200 capture one hundred percent (100%) of all defined user actions and reports them in near real-time. Moreover, the system 10 and methods 110, 200 avoid high costs of implementation and ongoing support. It is believed that no server-side only solutions exist and that the disclosed system 10 and methods 110, 200 provide such a server-side only solution, along with the associated benefits discussed above.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An asynchronously run, server-side computer implemented system, the system comprising:
    at least one computer server for receiving an electronic request through a reverse proxy/delivery infrastructure from a web enabled source, the at least one computer server comprising:
    a web application for creating a log message from the electronic request, the web application comprising an intercepting filter, a logging queue, and an asynchronous logger;
    an automated server-side web analytics system for processing the log message asynchronously and in near real-time web analytics data generated from the automated server-side web analytics system, wherein the automated server-side web analytics system comprises a metrics processing application comprising one or more collecting threads, one or more processing threads, and one or more reporting threads;
    a forward proxy/delivery infrastructure and a web analytics reporting system through which the web analytics data generated from the automated server-side web analytics system is transmitted from the at least one computer server;
    wherein the reverse proxy/delivery infrastructure analyzes the electronic request before it is forwarded to the at least one computer server and protects the at least one computer server from web based attacks, filters requests on application data fields, provides data encryption, enforces and verifies user authentication, and prevents unauthorized access.

2. The system of claim 1 wherein the at least one computer server further comprises a log file system for internally logging log files relating to the electronic request received from the web application.

3. The system of claim 1 wherein the at least one computer server further comprises an output log file system for internally logging information from the web analytics data generated from the automated server-side web analytics system.

4. The system of claim 1 wherein the asynchronous logger removes a log message from the logging queue and sends the log message to the automated server-side web analytics system and to a log file system.

5. The system of claim 1 wherein the metrics processing application comprises a configuration file having a plurality of configuration parameters and comprises an action handler configured to implement the configuration file.

6. The system of claim 1 wherein the metrics processing application comprises a controller configured to control a configuration file and configured to control output file logging that logs information for an output log file system.

7. An automated server-side web analytics system in a server-side web analytics computer implemented system, the automated server-side web analytics system comprising:
- a metrics processing application configured to process a log message from a web application in a computer server, the metrics processing application comprising:
  - one or more collecting threads configured to receive the log message from the web application and place the log message on an incoming queue;
  - one or more processing threads configured to remove the log message from the incoming queue, transform the log message into an action message, classify the action message, group the action message by session, and place the action message onto a reporting queue;
  - one or more reporting threads configured to remove the action message from the reporting queue, process and assemble the action message into a reporting message, and send the reporting message to a web analytics reporting system and to an output log file system;
- a configuration file comprising a plurality of configuration parameters;
- an action handler having a processing software code for implementing the metrics processing application; and
- a controller configured to control the configuration file and output file logging that logs information for an output log file system.

8. A method for building and sending action messages for third parties in a server-side web analytics computer implemented system, the method comprising the steps of:
- transmitting a log message from a web application in a computer server to a metrics processing application in an automated server-side web analytics system in the computer server;
- using one or more collecting threads to place the log message on an incoming queue;
- using one or more processing threads to remove the log message from the incoming queue, transform the log message into an action message, classify the action message, group the action message by session, and place the action message onto a reporting queue;
- using one or more reporting threads to remove the action message from the reporting queue;
- processing and assembling the action message into a reporting message via a configuration file and an action handler;
- building the action message to send to an external third party to inform the external third party how the action message should be built; and,
- sending the reporting message to a web analytics reporting system and to an output log file system.

9. The method of claim 8 further comprising the step of building a registration message specific to a desired application so that the external third party receives the registration message having unique parameters.

10. The method of claim 8 further comprising the step of capturing generated asynchronously and in near real-time web analytics data entirely on a server-side with no or minimal invasive code changes and with no or minimal instrumentation of the computer server.

11. The method of claim 8 wherein the step of processing and assembling the action message into the reporting message further comprises reading the configuration file and extracting desired information from the configuration file.

12. The method of claim 8 wherein the step of processing and assembling the action message into the reporting message further comprises using a processing software code of the action handler to implement the metrics processing application.

13. The method of claim 8 wherein the step of processing and assembling the action message into the reporting message further comprises the step of using the configuration file having a plurality of configuration parameters of defined, unique user actions that the automated server-side web analytics system reports of the external third party.

* * * * *